(12) United States Patent
Frahm et al.

(10) Patent No.: US 7,216,877 B1
(45) Date of Patent: May 15, 2007

(54) NON-POWERED TRANSPORTABLE CART AND BRAKE SYSTEM THEREFOR

(75) Inventors: Jeffry R. Frahm, Frankenmuth, MI (US); Matthew A. Royalty, Midland, MI (US)

(73) Assignee: Magline, Inc., Pinconning, MI (US)

( * ) Notice: Subject to any disclaimer, the term of this patent is extended or adjusted under 35 U.S.C. 154(b) by 0 days.

(21) Appl. No.: 11/196,957

(22) Filed: Aug. 4, 2005

Related U.S. Application Data

(60) Provisional application No. 60/598,652, filed on Aug. 4, 2004.

(51) Int. Cl.
*B62B 5/04* (2006.01)

(52) U.S. Cl. .............................. 280/79.11; 280/33.994; 188/19; 188/29

(58) Field of Classification Search ............. 280/79.11, 280/33.994; 188/19, 9, 10, 12, 29, 57, 31, 188/60, 265
See application file for complete search history.

(56) References Cited

U.S. PATENT DOCUMENTS

| | | | | |
|---|---|---|---|---|
| 2,716,031 A | * | 8/1955 | Roessler | 280/47.31 |
| 3,295,861 A | * | 1/1967 | Lull | 280/47.16 |
| 3,811,535 A | * | 5/1974 | Preusser | 188/29 |
| 3,950,005 A | * | 4/1976 | Patterson | 280/47.31 |
| 3,963,258 A | * | 6/1976 | Stone et al. | 280/47.34 |
| 4,526,253 A | * | 7/1985 | Schmidt | 188/1.12 |
| 4,793,445 A | * | 12/1988 | Collignon et al. | 188/29 |
| 5,531,295 A | * | 7/1996 | Kopman et al. | 188/21 |
| 6,098,761 A | * | 8/2000 | Kooima et al. | 188/23 |
| 6,206,385 B1 | * | 3/2001 | Kern et al. | 280/47.35 |
| 6,409,187 B1 | * | 6/2002 | Crow, Jr. | 280/47.34 |
| 6,511,082 B2 | * | 1/2003 | Shirai | 280/79.11 |
| 2005/0023787 A1 | * | 2/2005 | Haynes | 280/79.11 |

\* cited by examiner

*Primary Examiner*—Christopher P. Ellis
*Assistant Examiner*—John Walters
(74) *Attorney, Agent, or Firm*—Reising, Ethington, Barnes, Kisselle, PC

(57) ABSTRACT

A brake system operable to inhibit movement of a non-powered transportable cart. The cart has a platform with opposite front and rear ends, at least one pivotal caster wheel adjacent and supporting one of the front or rear ends, and a pair of fixed wheels. The brake system has a brake arm with a brake bar extending laterally therefrom. The brake arm is pivotal between a disengaged position and an engaged position. When in the disengaged position, a gap is defined between the brake bar and the fixed wheels to allow the fixed wheels to rotate freely. When in the engaged position, the brake bar engages the fixed wheels to prevent them from rotating. A brake latch is carried by the platform and has a catch sized to receive the brake arm to releasably maintain the brake arm in its engaged position.

23 Claims, 4 Drawing Sheets

NON-POWERED TRANSPORTABLE CART AND BRAKE SYSTEM THEREFOR

REFERENCE TO CO-PENDING APPLICATION

This application claims the benefit of U.S. Provisional Application Ser. No. 60/598,652, filed Aug. 4, 2004.

BACKGROUND OF THE INVENTION

1. Field of the Invention

This invention relates generally to non-powered transportable carts, and more particularly to carts transportable by hand and having a brake system.

2. Related Art

Hand propelled carts, particularly those having two or more caster wheels, are commonly used to transport various types of cargo, such as luggage, beverages, and otherwise heavy loads to facilitate a user's ability to transport the items in a reduced number of trips. Occasionally, the carts are propelled along inclined surfaces, thereby complicating the ability of the user to maintain control of the cart, particularly down steep inclines. In addition, it is often desirable to ensure that the cart remains in its stationary and intended position while the user leaves the cart momentarily. This can be difficult when the cart is on an otherwise uneven or inclined surface. Generally, in such a case where the cart is on an uneven surface, it is known to place relatively large objects behind the wheels of the cart in an effort to maintain the cart in its intended position. Unfortunately, items suitable for placement behind the wheels may not be readily available, and thus, the user may be inconvenienced.

SUMMARY

A brake system in combination with a non-powered transportable cart, the cart having a platform with opposite front and rear ends, at least one pivotal front caster wheel adjacent and supporting the front end and at least one pivotal rear caster wheel adjacent and supporting the rear end and a pair of central wheels located between the front and rear pairs of wheels. The brake system has a brake arm pivotally movable between a disengaged position and an engaged position with one end being pivotally carried by the platform and another end being arranged generally adjacent one of the front and rear ends. A brake bar extends laterally from the brake arm with a gap being defined between the brake bar and the central wheels when the brake arm is in its disengaged position. The brake bar engages the central wheels to prevent them from rotating when the brake arm is in its engaged position. A brake latch is carried by the platform and has a catch sized to receive the brake arm to releasably maintain the brake arm in its engaged position.

BRIEF DESCRIPTION OF DRAWINGS

Some of the objects, features and advantages of this invention will become apparent in view of the following detailed description of the presently preferred embodiments, best mode, appended claims and accompanying drawings, in which:

DETAILED DESCRIPTION OF THE PREFERRED EMBODIMENTS

Figure 1:
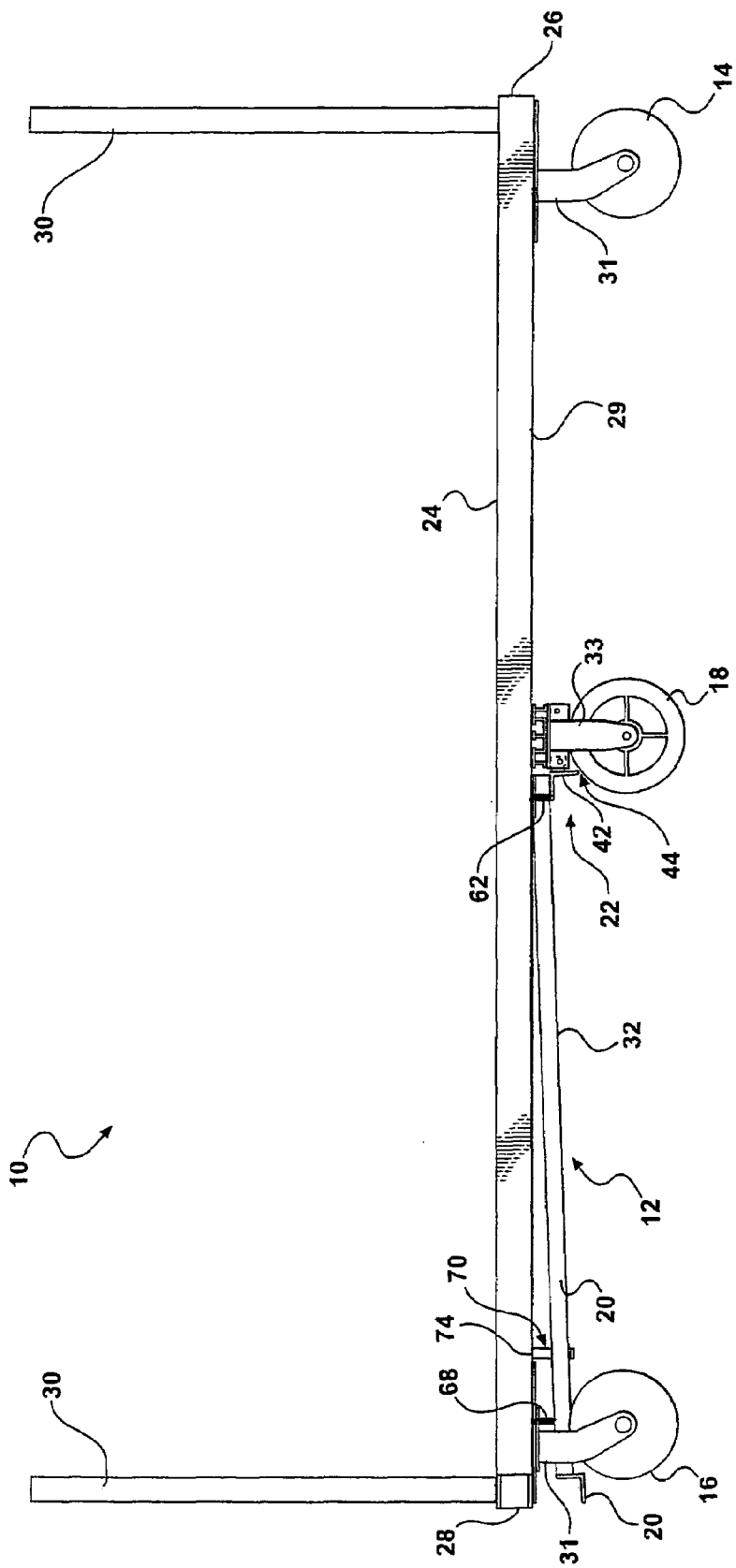
FIG. 1 is an elevation view of a hand cart constructed according to one embodiment of the invention.

Referring in more detail to the drawings, FIG. 1 illustrates a non-powered transportable cart 10 having a brake system 12 constructed according to one embodiment of the invention. The brake system 12 is suitable for a multi-wheeled hand propelled cart, such as a four wheeled cart having a pair of fixed or fixable rear or front wheels and a pair of casters wheels at it other end, for example. Otherwise, the multi-wheeled cart could have a single caster wheel at each of its ends, while having a pair of fixed or fixable wheels at its approximate midpoint, for example. The cart 10 is represented here, by way of example and without limitations, as a six-wheeled cart having a pair of front wheels 14 and a pair of rear wheels 16 with a pair of centrally located wheels 18 located generally midway between the front and rear wheels 14, 16, and thus, the front and rear ends 26, 28. The brake system 12 has a brake pedal 20 movable between a first disengaged position (FIG. 2) wherein a brake bar 22 is disengaged from the centrally located wheels 18, and a second engaged position (FIG. 3) wherein the brake bar 22 engages the centrally located wheels 18 to substantially prevent them from rotating. Accordingly, when the brake system 12 is in its engaged position, the cart 10 is effectively maintained in an immovable stationary position, as desired.

The cart 10 has a generally horizontal deck or platform 24 having opposite front and rear ends 26, 28. Desirably, the cart 10 has at least one, and shown here as a pair of hand rails 30 extending generally upwardly from the platform 24 generally adjacent the opposite ends 26, 28 to facilitate a user's ability to manually push the cart 10 by hand. The front and rear wheels 14, 16 are desirably provided as caster wheels that pivot freely about a vertical axis to enable the cart 10 to be easily maneuvered and pivoted about the centrally located wheels 18. The front and rear wheels 14, 16 are adapted to be operably attached to the underside 29 of the platform 24, such as through the use of brackets 31, for example, to support the platform 24 at it opposite ends 26, 28. Desirably, the centrally located wheels 18 are adapted to be operably attached to an underside 29 of the platform 24, such as through the use of brackets 33, for example, to support a central portion of the platform 24 and are generally a fixed-type or fixable-type non-pivoting pair of wheels. As such, the centrally located wheels 18 facilitate the user's ability to maintain the cart 10 in a generally straight line while the front and rear wheels 14, 16 facilitate the user's ability to turn, or even pivot the cart 10 about the centrally located wheels 18.

Figure 2:
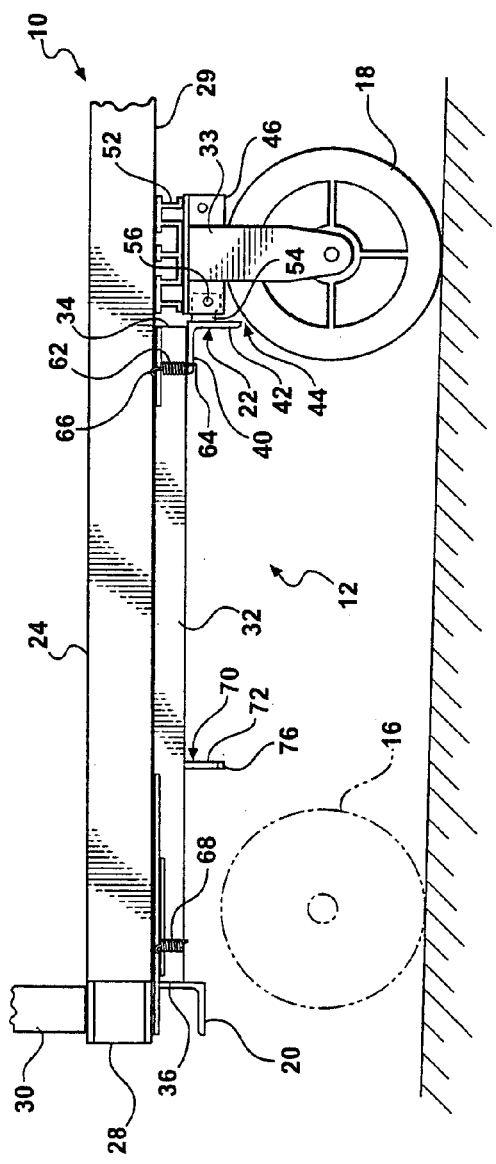
FIG. 2 is a partial elevation view of the hand cart of FIG. 1 with a brake system constructed according to one embodiment of the invention in a disengaged position.
Figure 3:
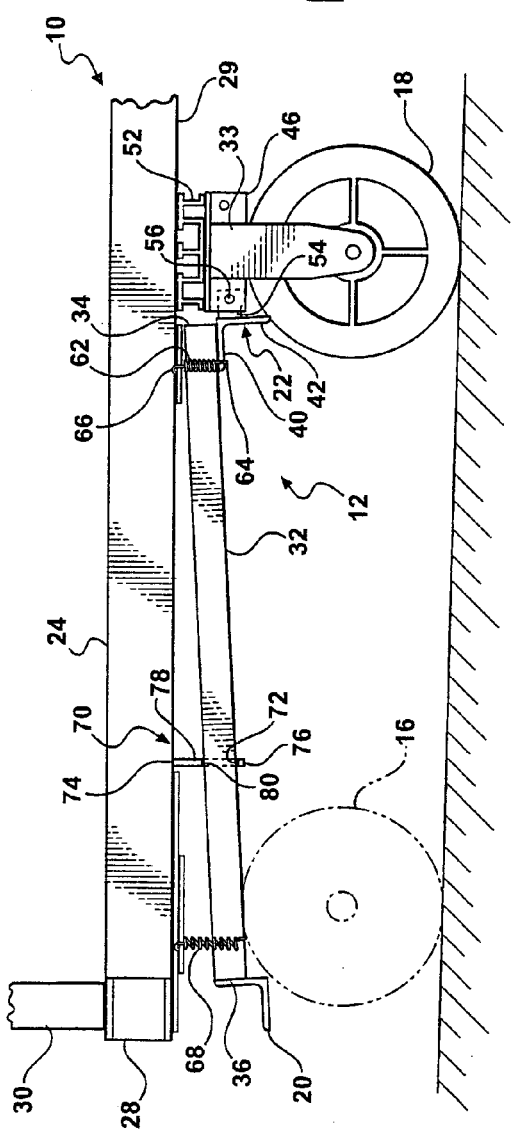
FIG. 3 is a view similar to FIG. 2 with the brake system in an engaged position.
Figure 4:
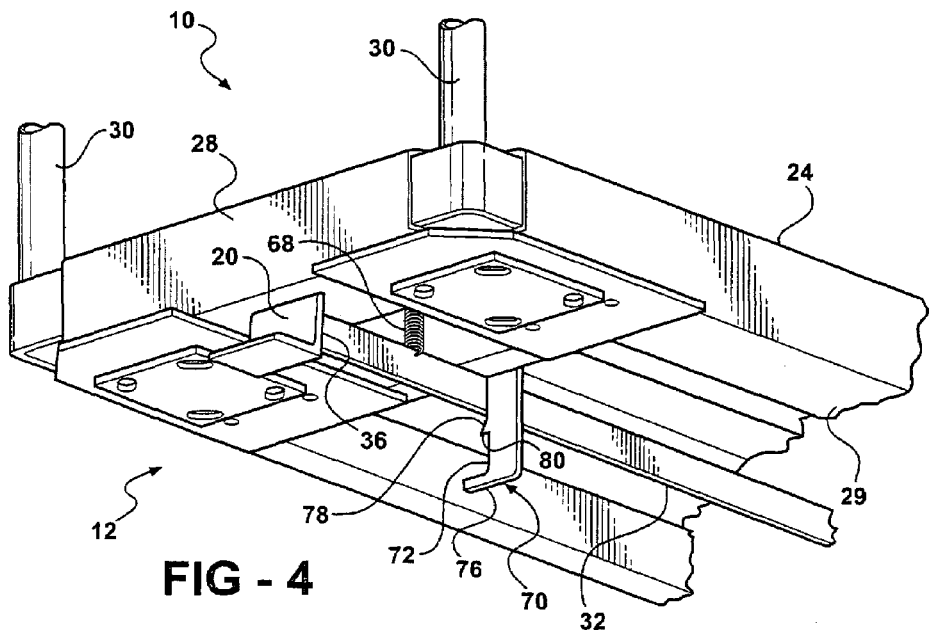
FIG. 4 is a partial perspective bottom view with a pair of end wheels removed from the hand cart of FIG. 1 showing a lock mechanism in an unlocked position.
Figure 5:
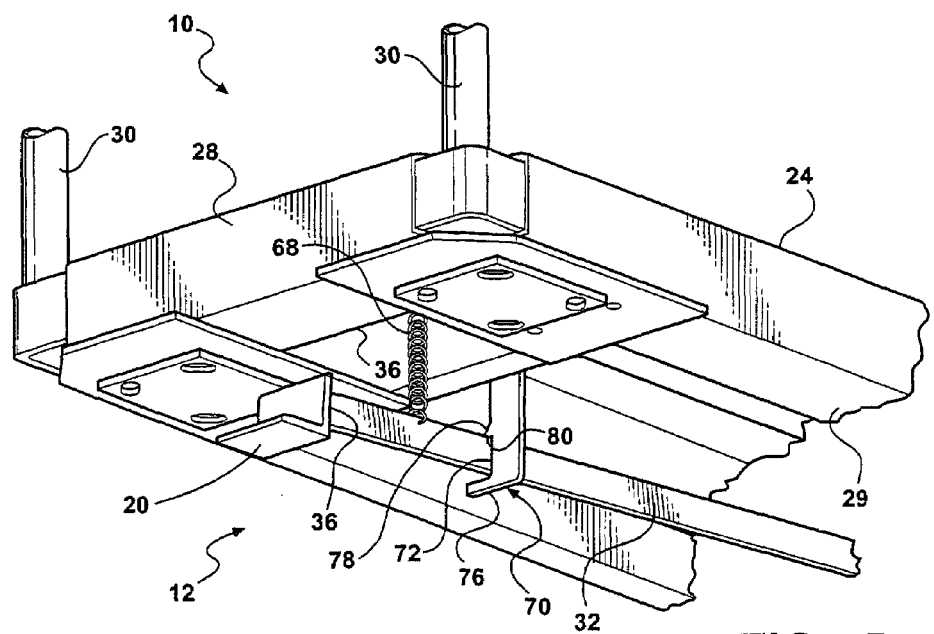
FIG. 5 is a view similar to FIG. 4 with the lock mechanism in a locked position.
Figure 6:
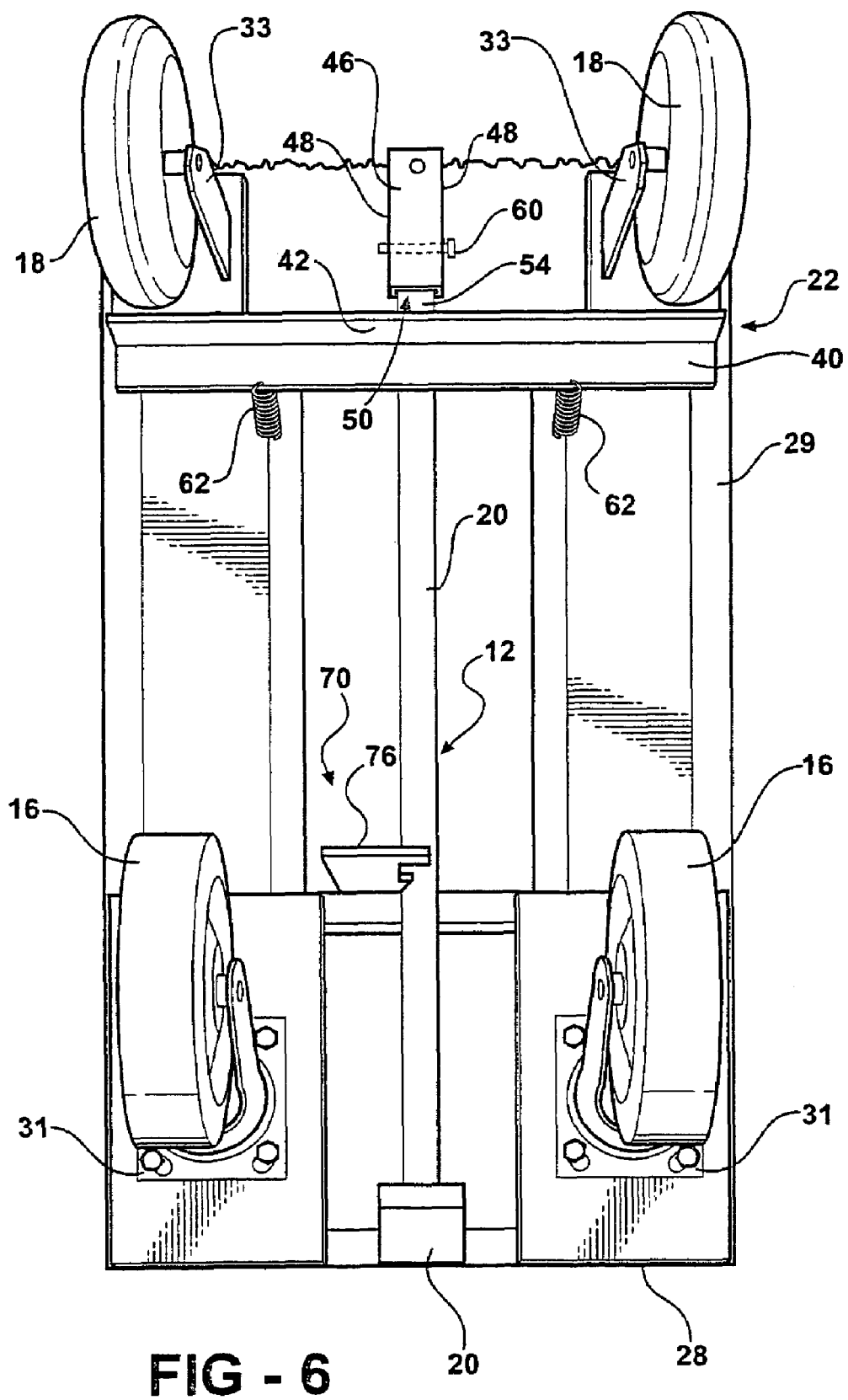
FIG. 6 is a partial bottom view of the hand cart of FIG. 1 with the brake system in the disengaged and unlocked position.

As best shown in FIGS. 2, 3 and 6, the brake system 12 includes an elongate brake arm 32 adapted for pivotal attachment to the cart 10 adjacent one of its ends 34 and having the brake pedal 20 carried adjacent its other end 36. Desirably, the arm 32 is constructed having a length so that the brake pedal 20 preferably does not extend beyond one or both of the ends 26, 28 of the cart 10, depending on whether a single or dual brake system is incorporated on the cart 10. As such, the brake pedal 20 does not interfere with the user, nor does it increase the overall length of the cart 10 beyond the length of the platform 24. It should be recognized that for other cart applications, the brake pedal can be combined with a foot operated lever extending upward above the platform 24, or replaced with a hand actuated lever (not shown) attachable to the hand rails 30. The hand lever could be arranged for operable communication with the brake arm 32, such as via a rod or cable, for example.

The brake bar 22 is arranged in operable communication with one end 34 of the arm 32 for conjoint movement therewith. The brake bar 22 extends laterally from the arm 32 and preferably generally perpendicular to the arm 32 for braking engagement with at least one, and preferably both wheels 18 to prevent rotation of the wheels 18 when the brake system 12 is moved to its engaged position. The brake bar 22 is shown here, by way of example and without limitations, as being generally L-shaped in lateral cross-section, wherein one leg 40 of the brake bar 22 is attached adjacent the end 34 of the arm 32, such as through a weld joint, for example. Another leg 42 of the brake bar 22 extends generally downwardly over the centrally located wheels 18 and defines a space or gap 44 between the brake bar 22 and at least one of the wheels 18. The gap 44 allows the wheels 18 to rotate freely when the brake system 12 is in its disengaged position. The leg 42 of the brake bar 22 contacts or frictionally engages the wheels 18 to brake or prevent the wheels 18 from rotating, thereby braking or resisting movement of the cart 10 when the brake system 12 is in its engaged position.

To facilitate pivotally attaching the arm 32 and brake bar 22 to the cart 10, a generally U-shaped bracket 46 having a pair of opposite sides 48 defining a channel 50 therebetween (FIG. 6) is attached to a spacer plate 52. The spacer plate 52 is attached to the underside 29 of the platform 24 generally centrally between the central wheels (FIGS. 2 and 3). A pivot arm 54 is attached to the downwardly extending leg 42 of the brake bar 22, such as through a weld joint, for example, wherein the pivot arm 54 extends from the leg 42 for receipt in the channel 50 of the bracket 46. The sides of the bracket 46 desirably have a pair of aligned openings 56 arranged for alignment with a through hole in the pivot arm 54. As such, a pin or bolt 60 is disposed through the openings 56 and the through hole to pivotally attach the pivot arm 54 and brake bar 22 to the bracket 46.

The brake arm 32 is desirably biased to its upward disengaged position by at least one biasing member, such as a spring, for example, and shown here as a pair of springs 62 (FIG. 6). The springs 62 have one end 64 attached to the horizontally extending leg 40 of the brake bar 22 and another end 66 operably attached to the underside 29 of the platform 24. To further bias the arm 32 upwardly, another spring 68 may be attached to the brake arm 32 adjacent its one end 36 to the underside 29 of the platform 24. Accordingly, as shown in FIGS. 1, 2, and 6, the brake system 12 is biased in its disengaged position by the springs 62, 68 to allow a user to freely push the hand rails 30 of the cart 10 to propel the cart 10 in the desired direction.

When desired, a user may prevent the cart 10 from rolling movement by depressing the brake pedal 20 with a foot to overcome the bias imparted by the springs 62, 68. As such, the brake arm 32 is moved from its upright disengaged position to its lowered engaged position, thereby moving the brake bar 22 into frictional braking engagement with the center wheels 18, as shown in FIG. 3. To maintain the brake system 12 in the engaged position, a generally rigid brake latch 70 has a pocket or catch 72 sized to receive the brake arm 32 to releasably maintain the brake arm 32 in its engaged position, unless otherwise desired. The brake latch 70 has one end 74 adapted for rigid attachment to the underside 29 of the platform 24 and depends from the platform 24 to a free end 76. The brake latch 70 has a cam surface 78 extending at an inclination laterally outwardly and terminating at the catch 72 to define a shoulder 80 within the catch 72 adjacent the cam surface 78. Therefore, as the brake pedal 20 is depressed, the brake arm 32 slides generally laterally and downwardly along the cam surface 78 until the brake arm 32 moves over and beyond the cam surface 78 for guided receipt in the catch 72. When completely beyond the cam surface 78, the brake arm 32 is moved back to its original axially extending orientation for receipt in the catch 72. As such, the shoulder 80 of the catch 72 overlies at least a portion of the brake arm 32 to prevent the arm 32 from moving back to its upright disengaged position under the bias of the springs 62, 68. Accordingly, the brake bar 22 is maintained in braking frictional engagement with the center wheels 18 to maintain the cart 10 in a stationary position until the brake system 12 is released to its disengaged position.

To disengage the brake system 12, the brake arm 32 is moved generally laterally out of the catch 72 of the brake latch 70 by moving the brake pedal 20 laterally, preferably with the user's foot. As such, the brake arm 32 moves free of the shoulder 80, thereby allowing the springs 62, 68 to bias the brake arm 32 back to its upright disengaged position. Accordingly, the brake bar 22 is disengaged from braking frictional engagement with the center wheels 18, and the cart 10 can be transported, as desired.

It should be recognized that the above description is meant to be illustrative of the preferred embodiments, and that other embodiments encompassing the same spirit are contemplated to be within the scope of the invention. For example, it is to be understood that the brake system 12, shown as extending to one end 28 of the cart 10 may extend to both ends 26, 28 of the cart 10. Accordingly, two generally identical brake systems 12 may be incorporated on a single cart (not shown). As such, a dual brake system would incorporate two of the brake systems 12 as described above, only in mirror relation to one another. Similarly, alternate methods of latching and unlatching the brake arm, such as a ratchet system, are also feasible. The scope of the invention is defined by the following claims.

The invention claimed is:

1. A brake system in combination with a non-powered transportable cart, said cart having a platform with opposite front and rear ends, at least one pivotal front caster wheel adjacent and supporting the front end and at least one pivotal rear caster wheel adjacent and supporting the rear end and a pair of central wheels located between the front and rear pairs of wheels, said brake system comprising:

a brake arm disposed laterally between said central wheels and extending from one end that is pivotally carried by said platform for movement toward and away from the platform and disposed adjacent to and laterally between said central wheels to another end generally adjacent one of said front or rear ends of said cart and laterally between said central wheels, said brake arm being pivotally movable between a disengaged position and an engaged position;

a brake bar extending laterally from said brake arm and defining a gap between said brake bar and said central wheels when said brake arm is in its disengaged position, said brake bar being mounted to move away from the platform to engage said central wheels to prevent rotation of said central wheels when said brake arm is in its engaged position; and a brake latch carried by said platform, said brake latch having a catch sized to receive said brake arm when said brake arm is in its engaged position to releasably maintain said brake arm in its engaged position to prevent said central wheels from rotating.

2. The combination of claim 1 including a pivot arm attached to said platform and to said brake bar to permit pivoted movement of said brake bar and brake arm relative to said platform.

3. The combination of claim 1 including at least one spring operably biasing said brake arm in the disengaged position.

4. The combination of claim 3 wherein said spring is attached to said brake bar.

5. The combination of claim 3 wherein said spring is attached to said brake arm.

6. The combination of claim 1 wherein said brake latch has a cam surface arranged for engagement with said brake arm while said brake arm is moving toward its engaged position to guide said brake arm into said catch.

7. The combination of claim 6 wherein said cam surface terminates at said catch to define a shoulder in said catch adjacent said cam surface and a pocket in which a portion of the brake arm is received when in the engaged position.

8. The combination of claim 7 wherein said shoulder overlies at least a portion of said brake arm while in said engaged position.

9. The combination of claim 1 wherein said one end of said brake arm is pivotally carried by said platform generally between said central wheels and the brake arm is disposed entirely beneath the platform in both its engaged and disengaged positions and during movement between those positions.

10. A non-powered transportable cart, comprising:
a platform having front and rear ends;
a pair of pivotal front caster wheels supporting said platform adjacent said front end;
at least one pivotal rear caster wheel supporting said platform adjacent said rear end;
a pair of central wheels supporting said platform between said front and rear wheels;
a brake arm extending beneath the platform between the central wheels at one end and between the front wheels at its other end, the brake arm being carried for pivotal movement toward and away from said platform for movement between a disengaged position and an engaged position;
a brake bar extending laterally from said brake arm for conjoint movement with said brake arm to move toward the platform and out of engagement with said central wheels when said brake arm is in said disengaged position and to move away from the platform and into braking frictional engagement with said central wheels when said brake arm is in said engaged position; and
a brake latch depending from said platform and having a catch sized to receive said brake arm when said brake arm is in its engaged position, said brake latch releasably maintaining said brake arm in its engaged position to prevent said central wheels from rotating.

11. The cart of claim 10 wherein said brake latch has a cam surface terminating at said catch, said cam surface being inclined to guide said brake arm into said catch.

12. The cart of claim 11 wherein a shoulder is defined in said catch adjacent said cam surface, said shoulder being arranged to overly at least a portion of said brake arm while in said engaged position.

13. The cart of claim 10 wherein said one end of said brake arm is pivotally carried generally between said central wheels and the brake arm is disposed entirely beneath the platform in both its engaged and disengaged positions and during movement between those positions.

14. The cart of claim 10 including at least one biasing member operably attached to said brake arm to bias said brake arm toward the disengaged position.

15. The cart of claim 14 wherein said biasing member is a spring.

16. A non-powered transportable cart, comprising:
a platform having front and rear ends;
at least one pivotal caster wheel supporting said platform adjacent at least one of said front or rear ends;
a pair of fixed wheels supporting said platform;
a brake arm extending linearly from one end adjacent to and laterally between the fixed wheels and another end adjacent one end of the platform, the brake arm being carried for pivotal movement generally linearly toward and away from said platform for movement between a disengaged position and an engaged position;
a brake bar extending perpendicular to and crossing said brake arm for movement with said brake arm to move out of engagement with both of said fixed wheels when said brake arm is in said disengaged position and to move into braking frictional engagement with both of said fixed wheels when said brake arm is in said engaged position; and
a brake latch depending from said platform and having a catch sized to receive said brake arm when said brake arm is in its engaged position, said brake latch releasably maintaining said brake arm in its engaged position to prevent said fixed wheels from rotating.

17. The cart of claim 16 wherein said fixed wheels are generally centrally located between said front and rear ends.

18. The cart of claim 17 wherein at least one caster wheel supports said platform adjacent each of said front and rear ends.

19. The cart of claim 16 which also comprises a pivot arm carried by the platform and connected to the brake bar between the fixed wheels, wherein said brake bar overlies a portion of each of said fixed wheels and is pivotally moveable about the pivot arm into engagement with the fixed wheels.

20. The combination of claim 16 wherein said brake latch has a cam surface arranged for engagement with said brake arm while said brake arm is moving toward its engaged position to guide said brake arm into said catch.

21. A brake system for a cart having a platform with opposite front and rear ends, at least one pivotal front caster wheel adjacent and supporting the front end and at least one pivotal rear caster wheel adjacent and supporting the rear end, and a pair of central wheels located between the front and rear pairs of wheels, the brake system comprising:
a brake arm extending from one end that is pivotally carried below said platform and disposed adjacent to and laterally between said central wheels to another end generally adjacent one of said front or rear ends of said cart and laterally between said central wheels, said another end of said brake arm being adapted to be moved relative to the platform by an operator of the cart to move the brake arm between a disengaged position and an engaged position; and a brake bar extending laterally from said brake arm and defining a gap between said brake bar and said central wheels when said brake arm is in its disengaged position, said brake bar being mounted to move away from the platform to engage said central wheels to prevent rotation of said central wheels when said brake arm is in its engaged position.

22. The brake system of claim 21 wherein said another end of the brake arm is disposed below the platform and is adapted to be pivoted away from the platform by a foot of the operator of the cart.

23. The brake system of claim 21 which also includes a brake latch carried by said platform, said brake latch having a catch sized to engage said brake arm when said brake arm is in its engaged position to releasably maintain said brake arm in its engaged position to prevent said central wheels from rotating.

* * * * *